UNITED STATES PATENT OFFICE.

HENRY AUGUST HUNICKE, OF ST. LOUIS, MISSOURI.

PROCESS OF MANUFACTURING ZINC.

SPECIFICATION forming part of Letters Patent No. 399,992, dated March 19, 1889.

Application filed November 26, 1888. Serial No. 291,892. (No specimens.)

*To all whom it may concern:*

Be it known that I, HENRY AUGUST HU-NICKE, of St. Louis, Missouri, have made a new and useful Improvement in the Process of Manufacturing Zinc, of which the following is a full, clear, and exact description.

The improvement relates to a process of zinc-reduction described in an application of mine for Letters Patent of the United States, No. 393,832, dated December 4, 1888, filed December 2, 1887, Serial No. 256,731, and which is based upon the fact that metallic zinc is oxidized by carbonic acid ($CO_2$) between the temperature at which zinc volatilizes and the temperature at which carbonic monoxide (CO) reduces zinc oxide, (ZnO,) and that above the last-named (reduction) temperature metallic zinc is not oxidized by carbonic acid, and no reaction occurs.

In carrying out the process referred to the ore, the necessary flux, and the fuel which supplies both the reducing agent and the means for maintaining the reduction-temperature are preheated to at least the temperature at which zinc oxide is reduced by carbonic oxide. The ore and the flux are heated separately from the fuel and in an oxidizing atmosphere. The ore, flux, and fuel thus preheated, together with air for supporting combustion, are charged into a reduction-chamber, and therein and at the temperature at which carbon monoxide reduces zinc oxide the ore is combined with carbon monoxide and zinc vapor produced, and without allowing its temperature to fall the zinc vapor is transferred to a condenser and there liquefied into zinc. The process is a practical one, and by means of it valuable results can be obtained. The carbonic acid, ($CO_2$,) however, which is present may be carried to the condenser and to some extent interfere with the operation, for after the various substances have been charged into the reduction-chamber and the reducing operation is progressing, and the carbon monoxide (CO) generated from the burning fuel is combining with the zinc oxide (ZnO) and reducing it to metallic zinc, (Zn,) the gases going off consist not only of metallic zinc vapor (Zn) and unconsumed carbon monoxide, (CO,) but also of carbonic acid ($CO_2$) derived from the reaction of carbon monoxide (CO) on zinc oxide, (ZnO,) and which carbonic acid, ($CO_2$,) owing to a lack of sufficient time or to other cause, is not by the carbon (C) in the fuel present reduced to carbon monoxide, (CO,) but is carried to the condenser along with the zinc vapor and carbon monoxide.

To prevent, or at least to hinder, this and to provide an improved process of zinc-reduction is the aim of this invention, which consists in passing the above-described gaseous current, consisting of zinc vapor, carbon monoxide, and carbonic acid, and heated, as described, through a chamber or passage charged with coke or any other solid carbonaceous fuel which has been heated prior to charging to a temperature at least sufficient to reduce carbonic acid ($CO_2$) to carbon monoxide, (CO,) and thereby causing the carbonic acid to be so reduced to carbon monoxide, and then delivering the zinc vapor—carbonic monoxide—current to a condenser of suitable construction, where the zinc vapor is liquefied and whence the carbonic monoxide is discharged to any desirable point—that is to say, in the place of delivering the gaseous current from the reduction-chamber directly to the condenser, it is first brought into contact with carbon, heated as described, and afterward delivered to the condenser. The more thorough the contact the more effectually is the process carried out. The condenser is preferably one having cooling-surfaces which are chilled by means of a cold liquid circulating in the rear of them.

I desire not to be restricted to any special form of carbon-chamber or to any special mode of subjecting the carbonic-acid bearing gaseous current to the heated carbon therein, saving that such construction and mode be such as to promote the action of the carbon in freeing the gaseous current of the carbonic acid and thereby minimizing the opportunity of the zinc vapors becoming oxidized in their passage to the condenser, and of the condenser becoming choked with oxidized zinc, and thereby increasing the output of the plant and cheapening the cost of the zinc-reduction.

I claim—

1. The herein-described process of manufacturing zinc, the same consisting in preheating the ore, fuel, and flux separately, as described, then introducing them so heated, together with air, into a reduction-chamber, and therein and at the temperature at which carbonic monoxide reduces zinc oxide combining the ore and carbon monoxide and producing zinc vapor, then conducting the zinc vapor, carbon monoxide—carbonic acid—gaseous current past heated carbon, and reducing the carbonic acid of the current to carbonic monoxide, and then transferring the current to a condenser and liquefying the zinc and discharging the carbonic monoxide.

2. The herein-described process of manufacturing zinc, the same consisting in introducing the zinc ore, fuel, and flux, together with air, into a reduction-chamber, and therein and at the temperature at which carbonic monoxide reduces zinc oxide combining the ore and carbonic monoxide and producing zinc vapor, carbonic monoxide, and carbonic acid, then conducting the zinc vapor, carbonic monoxide—carbonic acid—gaseous current into a separate chamber and into contact with carbon heated, as described, therein, and reducing the carbonic acid of the current to carbonic monoxide, and then transferring the current to a condenser and liquefying the zinc and discharging the carbonic monoxide.

Witness my hand this 23d day of November, 1888.

HENRY AUGUST HUNICKE.

Witnesses:
C. D. MOODY,
D. W. A. SANFORD.